J. F. HENRY.
PLANTING MACHINE.
APPLICATION FILED JUNE 9, 1913.
1,098,667.
Patented June 2, 1914.
2 SHEETS—SHEET 1.
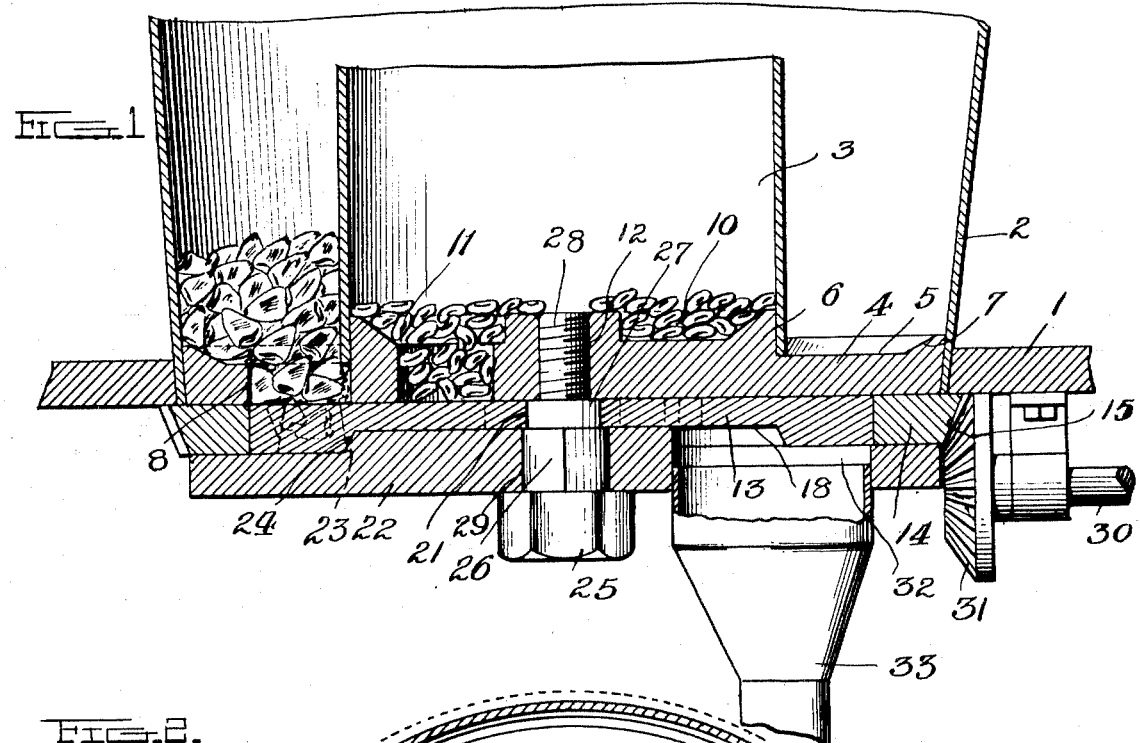
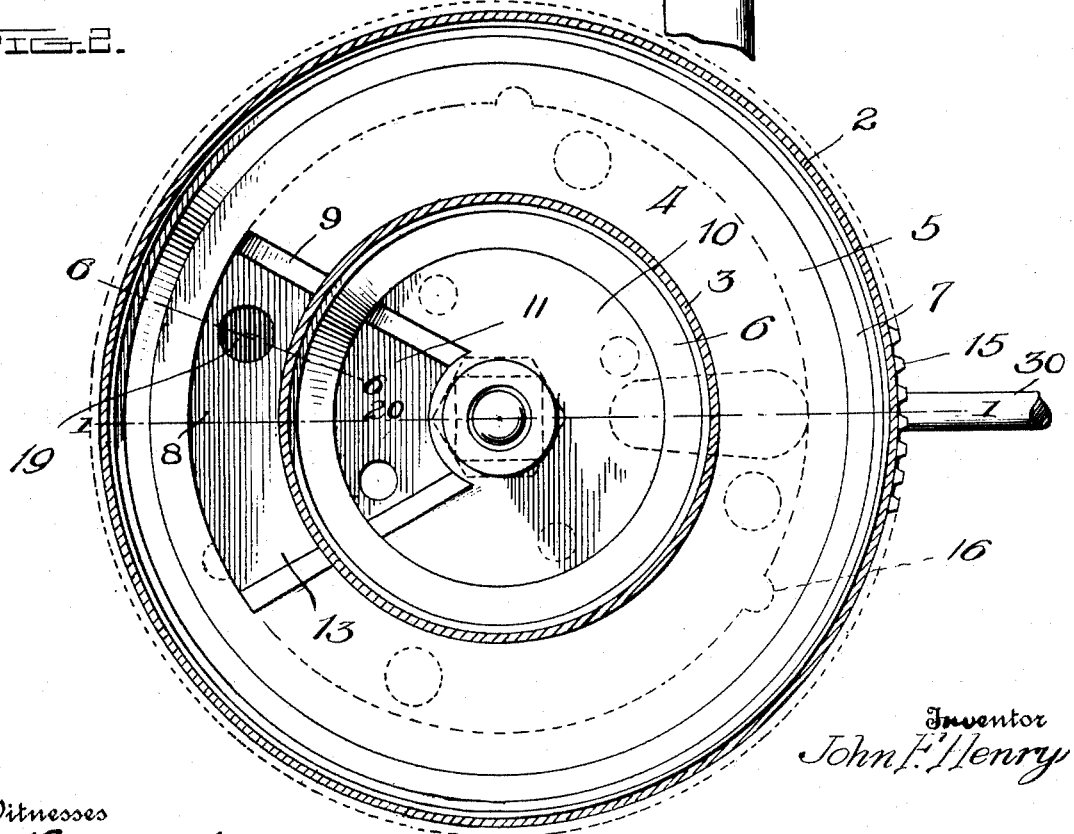
Inventor
John F. Henry
Witnesses
By
Attorneys

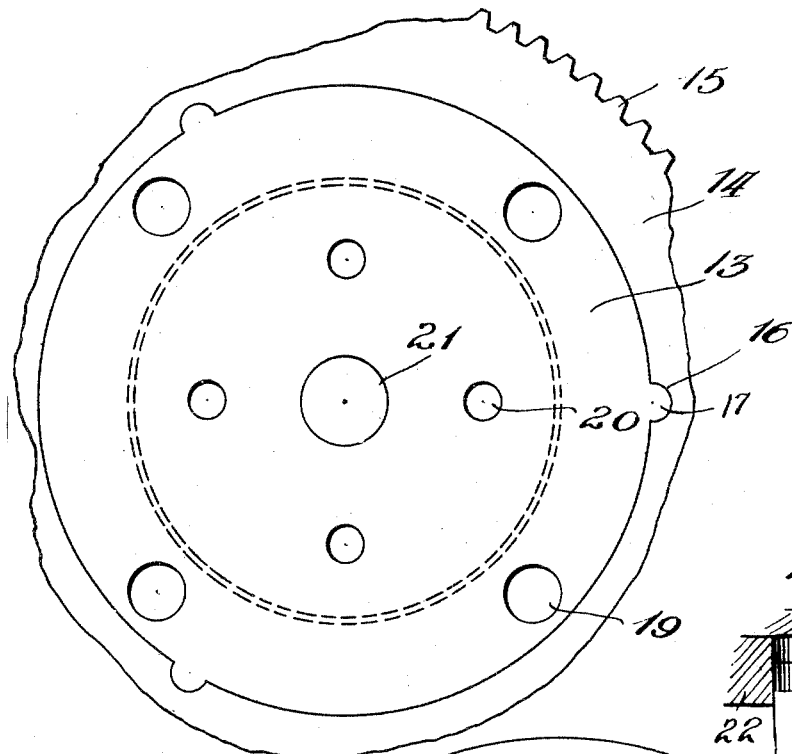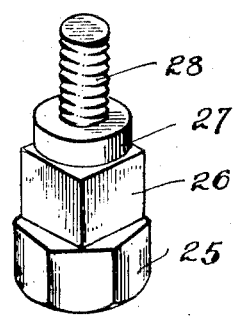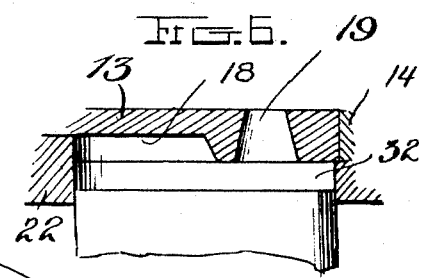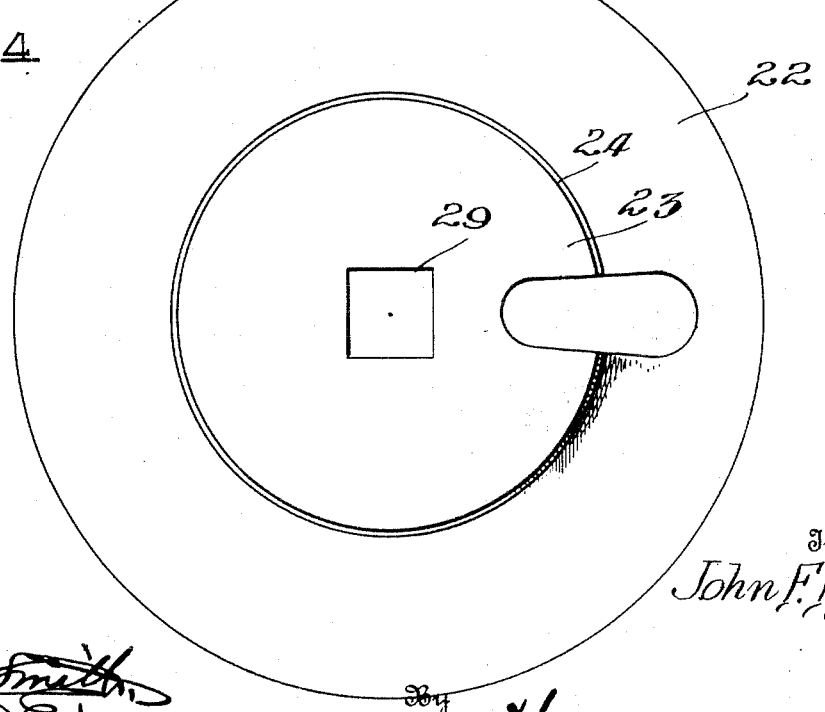

UNITED STATES PATENT OFFICE.

JOHN FAIRCHILDS HENRY, OF LONGDALE, OKLAHOMA, ASSIGNOR OF ONE-HALF TO STUART F. BRADY AND TOM E. WILLIS, COPARTNERS DOING BUSINESS AS BRADY & WILLIS, OF FAIRVIEW, OKLAHOMA.

PLANTING-MACHINE.

1,098,667. Specification of Letters Patent. Patented June 2, 1914.

Application filed June 9, 1913. Serial No. 772,707.

*To all whom it may concern:*

Be it known that I, JOHN FAIRCHILDS HENRY, a citizen of the United States, residing near the town of Longdale, on R. F. D. No. 1, in the county of Major and State of Oklahoma, have invented a new and useful Planting-Machine, called the "Henry Alternating Planter," of which the following is a specification.

This invention relates to seed planters and has as its primary aim to provide a planter adapted for use in planting two different kinds of seed simultaneously as, for example, corn and cow peas, soy beans and the like, the beans being dropped in hills between hills of corn in the same furrow. This method of planting has met with favor inasmuch as the corn crop extracts the substance from the soil and tends to deteriorate the same whereas a bean crop will enrich the soil and impart to it the nitrogen necessary to supply the growing corn thereby avoiding wholly or in part a deterioration of the soil as mentioned above. In this method of planting, however, it is obviously desirable that the two crops be planted in the same furrow and that the hills of corn and beans be properly relatively spaced and located in alinement so that both crops may be cultivated simultaneously.

The planter embodying the present invention is of that type including a rotary seed plate mounted beneath a cut-off plate in the bottom of the seed hopper and it is one aim of the invention to so form the seed plate and its supporting or bottom plate that the relative quantities of the two different kinds of seed to be planted will be selected with the accuracy necessary to the proper production of the respective crops.

Incidentally the invention has as its object to secure the result just mentioned leaving the upper surface of the seed plate, however, so that it will rotate smoothly and without likelihood of breaking the seeds and in order that seed plates of different sizes may be employed depending upon the relative sizes of the seeds to be planted without necessitating any change in the form of the cut-off plate.

Another aim of the invention is to provide a novel and simple means for rotatably supporting the seed plate beneath the cut-off plate which means is adapted also to support the bottom plate in fixed position and against rotation thereby avoiding the necessity of bracing or supporting this plate from the frame of the planter.

With these and other objects in view, the invention will be more fully described, illustrated in the accompanying drawings, and then specifically pointed out in the claims which are attached to and form a part of this application.

In the accompanying drawings: Figure 1 is a vertical transverse sectional view through the planter mechanism on the line 1—1 of Fig. 2. Fig. 2 is a top plan view of the mechanism, the frame and hoppers being omitted for the sake of clearness. Fig. 3 is a bottom plan view of the seed plate. Fig. 4 is a top plan view of the bottom plate. Fig. 5 is a detail perspective view of the spindle for the seed plate. Fig. 6 is a detail transverse sectional view on the line 6—6 of Fig. 2.

Corresponding and like parts are referred to in the following description and indicated in all the views of the drawings by the same reference characters.

In the drawings the frame of the planter is indicated in general by the numeral 1 and upon this frame are mounted the hoppers which are to contain the seeds to be planted, the main hopper being indicated by the numeral 2 and the auxiliary hopper being indicated at 3, the first mentioned hopper being designed to contain corn or other large seeds and the auxiliary hopper being adapted to contain the beans or relatively small seeds.

The cut-off plate of the planter mechanism is indicated in general by the numeral 4 and is fitted in the lower end of the hopper 2, this plate having its upper face formed with a depression 5 surrounding a raised portion 6 to which latter is fitted the lower end of the hopper 3. By reference to Fig. 1 of the drawings it will be observed that the outer wall of the depression 5 is beveled or inclined downwardly and inwardly as at 7 so that the seeds contained within the hopper 2 will be directed in the general direction of the outlet opening in the cut-off plate which opening is indicated at 8 and has its end walls beveled as at 9.

By reference to Fig. 2 it will be observed that the opening 8 is of segmental outline and that it extends part way around the recessed portion 6 of the cut-off plate so that it is adapted to receive and contain a relatively large number of grains of corn or other seed. The plate 4 within the boundaries of the recessed portion 6 is formed with a depression 10 corresponding in form to the depression 5 and the said plate in its said recessed portion is formed with an opening 11 preferably located opposite to or radially inwardly of the opening 8 and having its end walls beveled in the same manner as the walls 9. Axially plate 4 is formed with an opening 12 the wall of which is threaded. The under surface of the plate 4 is plane and unbroken and is preferably exposed at the lower end of the hopper 2 so that the seed plate may be disposed against the said face in a manner which will be presently explained.

The seed plate mentioned above is indicated in general by the numeral 13 and is seated within an annular gear 14 the teeth of the gear, indicated at 15, being formed upon its outer periphery. At intervals at its inner periphery the gear is provided with notches 16 in which are received lugs 17 formed at corresponding intervals at the margin of the plate 13. For a purpose to be presently explained the under side of the plate 13 is formed with a recess and its margin is formed with a series of openings 19 which are of relatively large diameter. The plate is formed with a series of openings 20 in its recessed portion 18 and the openings 20 are of relatively small diameter. For a purpose to be presently pointed out the plate is provided axially with an opening 21.

The bottom plate of the planter mechanism is indicated by the numeral 22 and is formed centrally with an up-standing boss 23 peripherally beveled as at 24 to fit the wall of the recess 18 in the manner clearly illustrated in Fig. 1 of the drawings. By reference to this figure it will be observed that the plate 22 is to be disposed against, the under side of the plate 13 with its marginal portion resting against the under side of the gear 14. It will also be apparent by reference to this figure and to Fig. 2 that as the seed plate 13 is rotated the openings 19 will pass successively beneath the opening 8 and the openings 20 will in a like manner pass beneath the opening 11. Furthermore, it will be apparent that the openings 19 and 20 are closed at their lower ends by the upper surface of the plate 22 and that due to the provision of the boss 23 and the recess 18 into which it fits the openings 20 are shallower than the openings 19 in view of which fact and the fact that they are of less diameter than the said openings 19 they are particularly adapted to receive a number of relatively small grains.

As a means for holding the several plates in assembled relation there is provided a spindle having a squared head 25, the shank of the spindle immediately adjacent to the said head being squared as at 26 or of some other polygonal form. The spindle immediately adjacent to the square portion 26 is cylindrical as indicated at 27 and its said cylindrical portion is of a diameter substantially equal to the diameter or thickness of the portion 26. Beyond its portion 27 the spindle is reduced in diameter and threaded into the opening 12 in the cut-off plate. The portion 27 of the spindle fits within the opening 21 in the seed plate 13 and the seed plate is in this manner mounted for rotation upon the spindle. The portion 26 of the spindle is received within a correspondingly formed opening 29 in the bottom plate 22 and due to the peculiar form of the said portion 26 and the opening 29 of said bottom plate is held against rotation with respect to the spindle, and as clearly shown by Fig. 1 of the drawings it is supported by the head 25 and in turn serves as a support for the seed plate.

The seed plate is adapted to be continuously rotated by means of a shaft 30 carrying a bevel pinion 31 in mesh with the teeth of the gear 14 and it will be obvious that as it rotates grains from the main and auxiliary hoppers will fall through the openings 8 and 11 respectively and into the openings 19 and 20 respectively as these openings pass beneath the first mentioned openings. The collected grains are carried around by the seed plate and are discharged through an opening 32 in the bottom plate 22 and fall into the seed boot 33.

It will be obvious that if very small grain or small seeds are to be planted the seed plate 13 or bottom plate 22 may be removed and replaced by corresponding other plates provided, however, respectively with a deeper recess 18 and higher boss 23 thereby decreasing the depth of the openings 20.

Having thus described the invention, what is claimed as new is:

1. A seed dropping mechanism including a bottom plate, and a seed plate mounted for rotation thereon, and a cut-off plate above the seed plate, the seed plate having its central portion recessed in its underside, the bottom plate having a raised portion fitting in the recess in the seed plate, the bottom plate having a discharge opening and the seed plate having an opening in its recessed portion and an opening in its portion outwardly of its recessed portion.

2. A seed dropping mechanism including a bottom plate, a seed plate mounted for rotation thereon, an apertured cut-off plate above the seed plate, the seed plate having concentric relatively thin and relatively thick portions and each of said portions being provided with a seed collecting opening, the bottom plate having concentric relatively thick and relatively thin portions disposed respectively against the relatively thin and relatively thick portions of the seed plate, and the said bottom plate having an outlet opening arranged to coincide with the openings in the seed plate.

3. A seed dropping mechanism including a bottom plate, and a seed plate mounted for rotation thereon, and a cut-off plate above the seed plate, the seed plate having its central portion recessed in its under side and having the side wall of its recess inwardly tapered, the bottom plate having a raised portion outwardly tapered and fitting within the recessed portion of the seed plate, said bottom plate having outlet opening and the seed plate being formed with openings in its recessed portion and its portion outwardly of its recessed portion both of said openings in the seed plate being arranged to coincide with the opening in the bottom plate.

4. A seed dropping mechanism including a bottom plate having a non-cylindrical opening therein, a seed plate mounted for rotation upon the bottom plate and having a cylindrical opening therein, a cut-off plate located above the seed plate and having seed outlet openings and provided with an opening the wall of which is threaded, and a stepped spindle threaded at one end of its shank into the opening in the cut-off plate and provided at the other end of its shank with a head engaging the underside of the bottom plate and supporting the same beneath the cut-off plate, the portion of the shank of the spindle adjacent the head non-rotatably fitting the opening in the seed plate.

JOHN FAIRCHILDS HENRY.

Witnesses:
   JOHN E. BAUMGARDNER,
   GEORGE H. MCDONALD.